United States Patent [19]
Jacobs

[11] 3,807,443
[45] Apr. 30, 1974

[54] POWER TRANSMISSION
[75] Inventor: Harvey C. Jacobs, Bellflower, Calif.
[73] Assignee: Sperry Rand Corporation, Troy, Mich.
[22] Filed: Dec. 8, 1972
[21] Appl. No.: 313,282

[52] U.S. Cl............... 137/501, 137/493, 137/493.9
[51] Int. Cl....................... F16k 31/12, F16k 17/22
[58] Field of Search ..... 137/501, 493, 493.7, 493.9, 137/503; 91/461, 468

[56] References Cited
UNITED STATES PATENTS
3,524,386  8/1970  Cudnohufsky................. 137/501 X
3,601,150  8/1971  Mito ................................ 137/501
3,485,368  12/1969  Berta ............................ 137/501 X Primary Examiner—Henry T. Klinksiek
Assistant Examiner—Robert J. Miller
Attorney, Agent, or Firm—Theodore Van Meter

[57] ABSTRACT

A pressure regulated constant flow valve has a fixed orifice and a regulated orifice in series, the regulated orifice maintaining a constant pressure drop across the fixed orifice. To maintain the pressure regulation effective for either direction of flow through the valve, a shuttle valve shifts when the direction of flow is reversed and reverses the connections of the regulator with the upstream and downstream sides of the fixed orifice.

5 Claims, 2 Drawing Figures

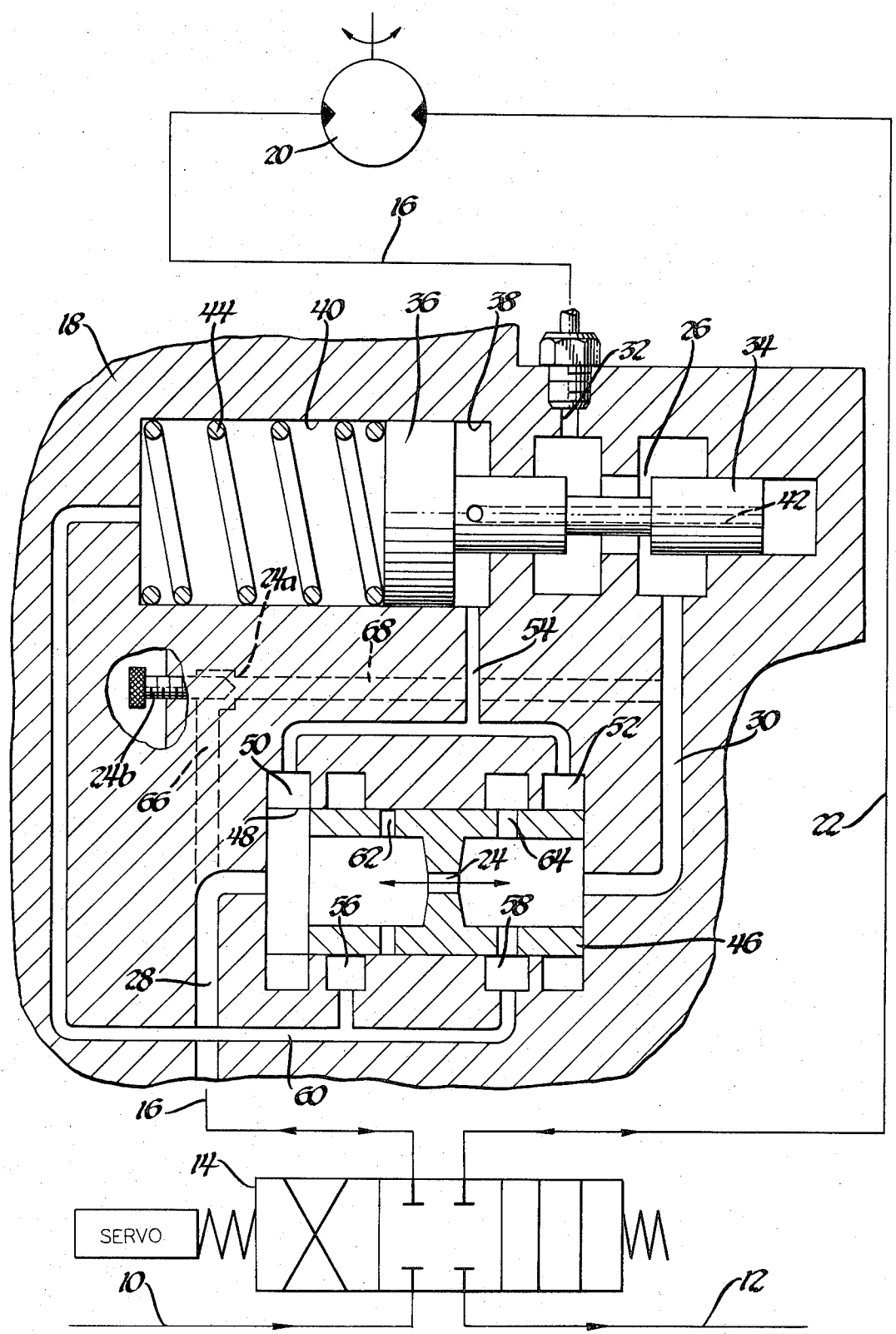

POWER TRANSMISSION

Pressure regulated flow control valves find wide application particularly in hydraulic power transmission systems. Most valves of this type are effective only for one direction of flow, and where it is desired to regulate the flow in either direction through the valve, the arrangements heretofore utilized have been cumbersome and expensive to produce.

It is an object of the present invention to provide an improved bi-directional pressure compensated flow control valve of simpler and less expensive construction than prior arrangements.

The invention contemplates a bi-directional pressure compensated flow control valve comprising a fixed orifice and a regulated orifice in series, orifice regulating means having opposed opening and closing areas, a shuttle valve connected to the regulating means and shiftable to connect the closing area with the upstream side of the fixed orifice and to connect the opening area with the downstream side thereof for each direction of flow through the valve.

IN THE DRAWING

The single FIGURE is a diagrammatic view of a valve and hydraulic circuit incorporating a preferred form of the present invention.

The hydraulic power transmission circuit diagramed in the drawing comprises a delivery line 10 extending from a pump, not shown, and an exhaust line 12 for returning fluid to the intake of the pump. A four-way reverse valve 14 connects these lines in either direction to a utilization circuit comprising a line 16, a flow regulating valve 18, a hydraulic motor 20 and a line 22. Except for the construction of the valve 18, this is a simplified representation, typical of hydraulic power circuits, in which fluid from a one-way source may be directed to drive a fluid motor either forwardly or reversely or to stop it.

The flow control valve 18 comprises a fixed orifice 24 and a regulated orifice 26 which are connected in series by conduits 28, 30 and 32 through which pressure fluid flows to or from the motor 20 via conduit 16. The regulated orifice 26 comprises a spool valve 34 which is shifted by a regulating means comprising a piston 36 dividing a valve closing chamber 38 from a valve opening chamber 40. The chamber 38 is connected to the right-hand end of the spool 34 by an internal passage 42. A spring 44 biases the valve spool 34 toward open position.

The fixed orifice 24 is carried by a shuttle valve spool 46 which slides in a bore 48 extending between conduits 28 and 30. The bore 48 has a pair of lateral ports 50 and 52 which communicate by a conduit 54 with the valve closing chamber 38. Spaced inwardly from these ports is a pair of ports 56 and 58 connected by a conduit 60 with the valve opening chamber 40. The spool 46 has radial passages 62 and 64 which alternately communicate with the ports 56 and 58 respectively.

The orifice 24 is of fixed size and thus regulates the motor speed 20 to a fixed value. Where it is desired to have adjustability of the motor speed, the orifice 24a may be utilized having an adjustable needle valve 24b. When this orifice is located in the body of the valve between conduits 66 and 68, the orifice 24 in the shuttle valve 46 may then be omitted. In referring hereafter to a fixed orifice, it will be understood that the expression includes either a permanently fixed orifice such as 24 or an adjustably fixed orifice such as 24a, 24b.

In operation, with fluid being supplied from conduit 10 and with valve 14 shifted to the left, flow is from line 10 into conduit 16 and out of conduit 22 to the exhaust conduit 12. Fluid entering the passage 28 will have shifted the shuttle valve spool 46 to the right as shown and flow will occur through the orifice 24, conduit 30 and orifice 26 to the conduit 32 and continue on through line 16 to the motor 20 which exhausts its output to line 22. The regulator piston 36 will shift the valve spool 34 so as to enlarge or restrict the orifice 26 in accordance with changes in the load on the motor 20 and is effective to maintain a constant pressure drop across the fixed orifice 24 in a well-known manner. Thus, the valve closing chamber 38 is connected to the upstream side of orifice 24 through port 50 and passage 54. The valve opening chamber 40 is connected to the downstream side of fixed orifice 24 through port 58 and passage 60.

When directional valve 14 is shifted to reverse flow through the power circuit, pressure will build up at the right-hand end of shuttle valve 46 and shift it to its opposite position. This reverses the connection between upstream and downstream sides of fixed orifice 24 and the opening and closing chambers of the regulator piston 36. Thus, the valve closing chamber 38 is connected to the right-hand side of orifice 24 through port 52 and passage 54. Likewise, the valve opening chamber 40 is connected to the downstream side of orifice 24 through port 56 and passage 60. The regulator will thus continue to maintain a constant pressure drop across the fixed orifice while flow occurs in this reversed direction.

I claim:

1. A bi-directional, pressure compensaed, flow control valve comprising a fixed orifice and a regulated orifice in series, orifice regulating means having opposed opening and closing areas, a shuttle valve connected to the regulating means and shiftable to connect the closing area with the upstream side of the fixed orifice, and to connect the opening area with the downstream side thereof for each direction of flow through the valve.

2. A valve as defined in claim 1 wherein the fixed orifice is carried by the shuttle valve.

3. A valve as defined in claim 1 wherein the shuttle valve is exposed at one end to pressure at one side of the fixed orifice and exposed at the opposite end to pressure at the opposite side of the fixed orifice.

4. A valve as defined in claim 3 wherein the fixed orifice is constituted by a passage between the ends of the shuttle valve.

5. A valve as defined in claim 4 wherein the regulating means is spring biased in the opening direction.

* * * * *